(12) United States Patent
Lau et al.

(10) Patent No.: US 11,036,913 B2
(45) Date of Patent: Jun. 15, 2021

(54) INTEGRATED CIRCUIT METHODS USING SINGLE-PIN IMAGINARY DEVICES

(71) Applicant: Marvell Asia Pte, Ltd., Singapore (SG)

(72) Inventors: Heng Lan Lau, Port Townsend, WA (US); Manjunatha Prabhu, Clifton Park, NY (US); Vikrant Kumar Chauhan, Cohoes, NY (US); Shawn Walsh, Mogadore, OH (US)

(73) Assignee: Marvell Asia Pte., Ltd., Singapore (SG)

( * ) Notice: Subject to any disclaimer, the term of this patent is extended or adjusted under 35 U.S.C. 154(b) by 0 days.

(21) Appl. No.: 16/806,417

(22) Filed: Mar. 2, 2020

(65) Prior Publication Data
US 2020/0202065 A1    Jun. 25, 2020

Related U.S. Application Data

(63) Continuation of application No. 16/008,176, filed on Jun. 14, 2018, now Pat. No. 10,579,774.

(51) Int. Cl.
*G06F 30/398* (2020.01)
*G06F 30/394* (2020.01)
(Continued)

(52) U.S. Cl.
CPC ........ *G06F 30/398* (2020.01); *G06F 2111/04* (2020.01); *G06F 2111/20* (2020.01); *G06F 2119/18* (2020.01)

(58) Field of Classification Search
CPC .... G06F 30/398; G06F 30/394; G06F 30/392; G06F 2111/04; G06F 2119/18;
(Continued)

(56) References Cited

U.S. PATENT DOCUMENTS

| 5,481,695 A | 1/1996 | Purks |
| 6,028,989 A | 2/2000 | Dansky et al. |

(Continued)

OTHER PUBLICATIONS

Tak Young, "IC Layout Must Avoid Crosstalk Problems," EE Times, Jun. 5, 2002, https://www.eetimes.com/documenl.asp?doc_id=1277678, pp. 1-5.

(Continued)

*Primary Examiner* — Vuthe Siek

(57) ABSTRACT

A method includes accessing, from a memory, a schematic diagram of a circuit that depicts components of the circuit and, connected to one or more of the components, single-pin imaginary devices associated with group properties of the components. The method further includes automatically generating a design layout for the circuit based on the schematic diagram. The design layout comprises shapes representing the components and, on each shape representing a specific component that is connected to a single-pin imaginary device, a specific group label corresponding to a specific group property of the specific component. Placement of the shapes within the design layout is group label dependent. Accessing of the schematic diagram and the automatically generating of the design layout are performed by a layout generator tool executed by a processor of a computer-aided design system.

4 Claims, 9 Drawing Sheets

(51) Int. Cl.
*G06F 30/392* (2020.01)
*G06F 111/04* (2020.01)
*G06F 111/20* (2020.01)
*G06F 119/18* (2020.01)

(58) Field of Classification Search
CPC .. G06F 2111/20; G06F 111/04; G06F 119/18; G06F 111/20
See application file for complete search history.

(56) References Cited

U.S. PATENT DOCUMENTS

| | | |
|---|---|---|
| 8,904,326 B2 | 12/2014 | Huang et al. |
| 8,943,454 B1 | 1/2015 | Hsiao et al. |
| 9,740,815 B2 | 8/2017 | Bickford et al. |
| 9,836,570 B1 | 12/2017 | Azuma et al. |
| 10,073,942 B1 | 9/2018 | Ginetti |
| 2014/0181602 A1 | 6/2014 | Mittal et al. |
| 2014/0282308 A1 | 9/2014 | Chen et al. |
| 2014/0282344 A1 | 9/2014 | Hsu et al. |
| 2014/0380258 A1 | 12/2014 | Hours et al. |
| 2016/0181235 A1 | 6/2016 | Pincu et al. |
| 2017/0124235 A1* | 5/2017 | Ferguson ................ G06F 30/39 |
| 2017/0169151 A1* | 6/2017 | Cellier ................ G06F 30/367 |
| 2018/0121594 A1 | 5/2018 | Studders |

OTHER PUBLICATIONS

Santonja et al., "Multi-Supply Digital Layout," Same 2001, Session 2: DEA Methodology, Nov. 15, 2001, https://vww_slideshare.nel/regissantonja/multisupply-digital-layout, pp. 1-12.
"Simulation Standard," Connecting TCAD to Tapeout, A Journal for CAD/GAE Engineers, vol. 13,No. 12,2003, pp. 1-3.

* cited by examiner

INTEGRATED CIRCUIT METHODS USING SINGLE-PIN IMAGINARY DEVICES

CROSS-REFERENCE TO RELATED APPLICATIONS

The present disclosure is a continuation of U.S. patent application Ser. No. 16/008,176, filed on Jun. 14, 2018. The entire disclosure of the application referenced above is incorporated herein by reference.

FIELD OF THE INVENTION

The present invention relates to area-optimized integrated circuit (IC) design and, particularly, to computer-aided design (CAD) systems and methods that enable IC components with common features (e.g., nets that are in-phase, also referred to as tracking nets) to be identified and considered during the design flow, particularly, during IC design layout generation (e.g., for area-optimization) and layout verification (e.g., for chip reliability).

DESCRIPTION OF RELATED ART

In integrated circuit (IC) design, a schematic-driven layout (SDL) tool is a computer-aided design (CAD) tool that analyzes a schematic diagram of an IC and, based on the information contained in that schematic diagram and further based on a set of design rules for a particular technology node at issue, generates a design layout for the IC. The design layout generated by the SDL tool will subsequently undergo physical verification, which includes, but is not limited to: layout versus schematic (LVS) processing by a LVS tool and design rule checking (DRC) by a DRC tool.

Specifically, those skilled in the art will recognize that a schematic diagram for an IC includes symbols representing real elements (e.g., devices) contained in the IC and the electronic connections between those real elements. The design rules are specifications that must be met to ensure that the IC will function properly when fabricated. For example, those skilled in the art will recognize that a technology node (also referred to as a process node) is typically identified in nanometers (e.g., a 45 nm, 32 nm, 22 nm, 14 nm, etc.), thereby indicating the size of the semiconductor features that can be formed on a wafer using the technology. The technology node may also indicate the type of wafer, such as a silicon-on-insulator (SOI) wafer (e.g., 45 nm SOI, 32 nm SOI, 22 nm SOI, etc.). Each technology node can be associated with sets of design rules (also referred to as sets of ground rules, rule decks, run sets, etc.). These sets of design rules can be incorporated into a process design kit (PDK) and applied during particular stages in the design flow (e.g., at power planning, at input/output pin placement, at library element placement, at clock planning, at wire routing, etc.) in order to ensure optimal manufacturability (i.e., in order to ensure that the intended functionality of an IC design can be achieved with a high degree of yield and reliability). Such design rules can, for example, include geometric constraints (also referred to as tolerances or critical dimensions) on the mask patterns used at the various levels of an IC design layout (e.g., minimum and maximum shape dimensions, minimum and maximum spacing between shapes, etc.). The SDL tool will generate a design layout for an IC and this design layout will contain geometric shapes (i.e., polygons) that correspond to mask patterns in the different levels of the IC (e.g., active device level, polysilicon level, metal levels, etc.) as required by the schematic diagram and placement of the shapes in the design layout will be made with the goal of avoiding any design rule violations.

The design layout can subsequently undergo physical verification by a LVS tool and by a DRC tool. The LVS tool and DRC tool both perform an analysis of the layout. For example, the LVS tool performs a multi-stage LVS process that includes extraction (whereby the circuit elements are extracted from the design layout), reduction (whereby a new schematic diagram is generated based on the extracted circuit elements) and comparison (whereby the new schematic diagram is compared to the original schematic diagram to confirm that they match). If the design layout fails to pass this LVS process, the design layout can be revised. Additionally, the DRC tool can analyze the design layout to determine if any of the design rules have been violated. If the design layout fails to pass DRC, the design layout can be revised.

Oftentimes, however, the design rules of a specific technology node will be overly pessimistic (i.e., enforced based on the assumption of worst-case conditions) and this pessimism can result in unnecessary area for performance trade-offs. For example, existing technology node-specific design rules will typically include a design rule that specifies a minimum allowable space between adjacent nets and this minimum allowable space is set so as to avoid Time Dependent Dielectric Breakdown (TDDB) in the event of the worst-case conditions. TDDB is more rapid where the delta voltage between physical nets is higher. However, considering that in a given IC design, some nets will be in-phase and/or will have the same operating voltages, the worst-case conditions may never occur between some adjacent nets and, in this case, enforcing the minimum allowable space between those nets results in unnecessary area consumption (i.e., unnecessarily limits size scaling).

SUMMARY

Generally, disclosed herein are integrated circuit (IC) design systems and methods that enable components with common features (e.g., nets that are in-phase, also referred to as "tracking nets") to be identified and considered during the design flow, particularly, during IC design layout generation (e.g., for area-optimization) and/or layout verification (e.g., for chip reliability).

An embodiment of the design method can include accessing, from a memory, a schematic diagram of an integrated circuit (IC). The schematic diagram can specifically depict nets and, connected to at least two of the nets, single-pin first imaginary devices associated with tracking group properties of those nets and single-pin second imaginary devices associated with voltage properties of the nets. Specifically, the nets can be assigned into groups based on a common feature and, particularly, based on the phase of signal propagation. The tracking group property of a net indicates the specific tracking group of the net. All adjacent nets in the same tracking group will be in-phase and all adjacent nets in different tracking groups, including adjacent nets with no group information, will be out-of-phase. The voltage property of a net indicates the maximum high and low voltages on the net. The design method can further include automatically generating a design layout for the IC based on this schematic diagram. The design layout can specifically include net shapes representing the nets and, on each net shape that represents a specific net that is connected to a single-pin first imaginary device and a single-pin second imaginary device, specific tracking group and voltage labels corresponding to the specific tracking group and voltage properties of the specific net. Placement of the net shapes within the design layout during routing can be tracking group and voltage label dependent (i.e., according to tracking group and voltage-aware design rules that provide for placement based upon the tracking group and voltage labels). For example, these design rules can prioritize grouping together, within the design layout during routing, net shapes with the same tracking group label and can further dictate minimum allowable spacing requirements that are smallest for net shapes with the same tracking group and voltage labels, larger for net shapes with the same tracking group label but different voltage labels, and even larger for net shapes with different tracking group labels. These design method steps can be performed, for example, by a layout generator tool executed by a processor of a computer-aided design (CAD) system.

Another embodiment of the design method can include automatically performing a physical verification of a design layout and, particularly, a design layout as discussed above. In this case, the design method can include accessing, from a memory, an original schematic diagram (which includes the single-pin first and second imaginary devices discussed above and used for identifying voltage and tracking group properties), a design layout (which was generated based on the original schematic diagram), and tracking group and voltage-aware design rules. The design method can further include automatically performing a physical verification of the design layout. Specifically, the physical verification of the design layout can include a layout-versus-schematic (LVS) process. The LVS process can include generating a new schematic diagram based on the design layout. The new schematic diagram can include: nets corresponding to the net shapes and, connected to any net corresponding to any net shape with a tracking group label and a voltage label, a single-pin first imaginary device associated with a tracking group property specified by the tracking group label and single-pin second imaginary device associated with a voltage property specified by the voltage label. The LVS process can further include comparing the new schematic diagram to the original schematic diagram to determine whether the new schematic diagram and the original schematic diagram match. The physical verification of the design layout can also include a tracking group and voltage-aware design rules check (DRC). The tracking group and voltage-aware DRC can include, when the design layout passes the LVS process, determining whether, given the tracking group and voltage labels, placement of the net shapes in the design layout satisfies the tracking group and voltage-aware design rules. These design method steps can be performed, for example, by a layout-versus-schematic (LVS) tool executed by a processor of CAD system.

It should be noted that other design method embodiments could similarly use single-pin imaginary devices in a schematic diagram for the purpose of identifying one or more groups of components and also group-aware design rules during design layout generation. Specifically, an embodiment of a design method can include accessing, from a memory, a schematic diagram that depicts components of an IC and, connected to at least two of the components, single-pin imaginary devices that are associated with group properties of the components. That is, some components in the IC can be assigned to groups (e.g., based on a common feature). In the schematic diagram, each component that is assigned to a specific group can be connected to a single-pin imaginary device, which is associated with a specific group property that identifies the specific group. The design method can further include automatically generating a design layout based on this schematic diagram. This design layout can include shapes representing components at different levels of the IC design and also group labels on any of those shapes that were connected to imaginary devices, wherein the group labels correspond to the group properties of the components. Specific placement of the shapes within the design layout (e.g., during library element placement and/or routing) can be group label dependent (i.e., can be performed according to group-aware design rules). These design method steps can be performed, for example, by a layout generator tool executed by a processor of a CAD system.

Another embodiment of a design method can include accessing, from a memory, an original schematic diagram (which includes the single-pin imaginary devices discussed above and used for identifying group properties), a design layout (which was generated based on the original schematic diagram), and group-aware design rules. The design method can further include automatically performing a physical verification of the design layout. The physical verification of the design layout can include performing a layout-versus-schematic (LVS) process. The LVS process can include converting the design layout to a new schematic diagram. The new schematic diagram can include circuit components that correspond to the shapes in the design layout and, connected to any of those components corresponding to shapes with group labels, single-pin imaginary devices with group properties specified by the group labels. The new schematic diagram can then be compared to the original schematic diagram to determine whether the new schematic diagram and the original schematic diagram match. The physical verification of the design layout can also include a group-aware design rules check (DRC) that includes, when the design layout passes the LVS process (as described above), determining whether, given the group labels, placement of the shapes in the design layout satisfies the group-aware design rules. These design method steps can be performed, for example, by a layout-versus-schematic (LVS) tool executed by a processor of a CAD system for purposes of illustration only and are not intended to limit the scope of the disclosure.

BRIEF DESCRIPTION OF THE SEVERAL VIEWS OF THE DRAWINGS

The present invention will be better understood from the following detailed description with reference to the drawings, which are not necessarily drawn to scale and in which.

DESCRIPTION

Figure 1:
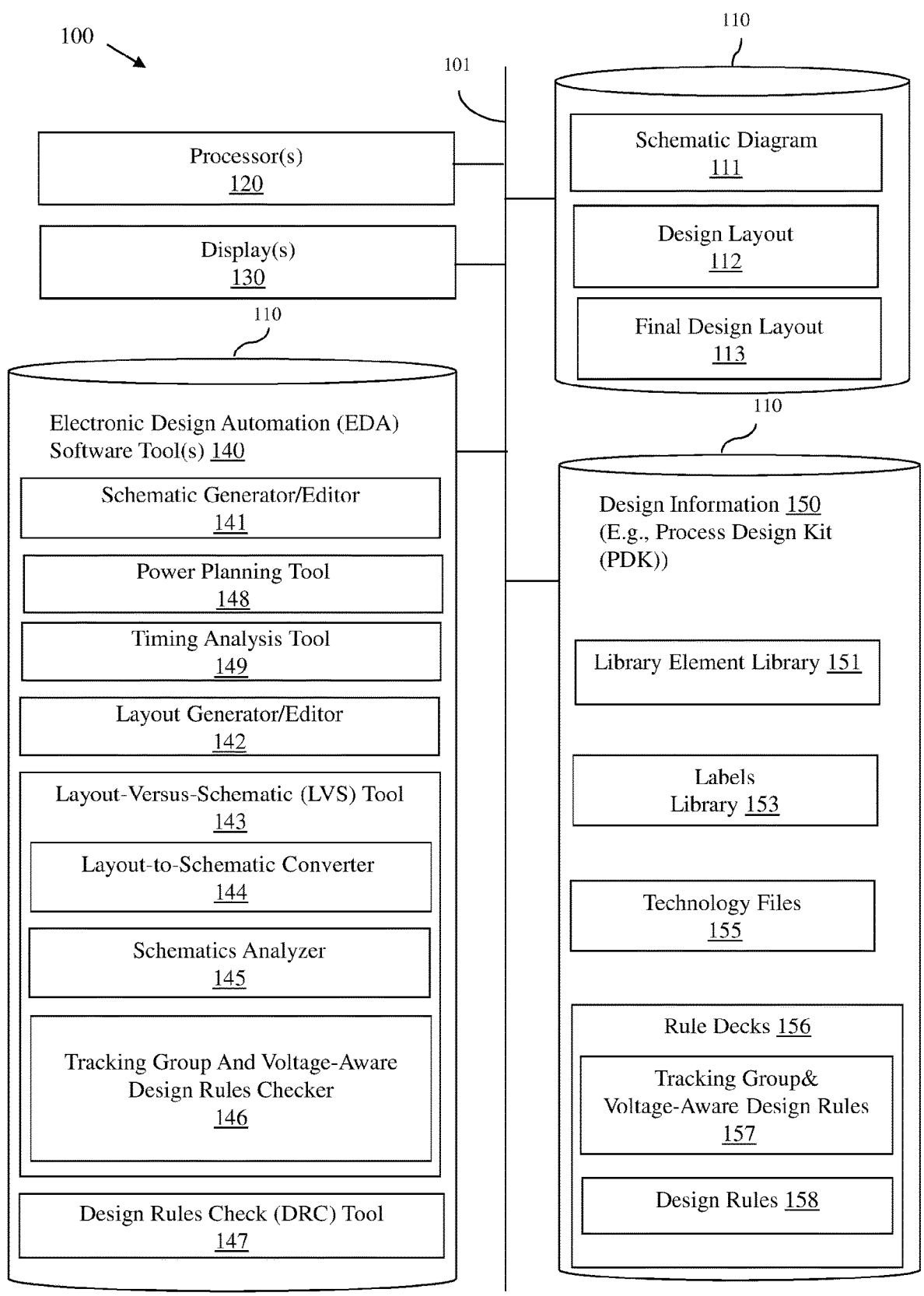
FIG. 1 is a schematic diagram illustrating an embodiment of a computer-aided design (CAD) system for integrated circuits.

As mentioned above, oftentimes the design rules of a specific technology node will be overly pessimistic (i.e., enforced based the assumption of worst-case conditions) and this pessimism can result in unnecessary area for performance trade-offs.

In view of the foregoing, disclosed herein are embodiments of computer-aided integrated circuit (IC) design systems and methods. In the embodiments, some circuit components have common features that can be noted within the IC schematic diagram using single-pin imaginary devices so that these common features can be considered during the design flow to, for example, minimize area consumption and improve IC reliability.

For purposes of this disclosure, an "imaginary device" in a schematic diagram is device symbol that is not representative of an actual device within the IC (i.e., a device that is to be manufactured), but instead is inserted into the schematic diagram and employed in order to provide additional, circuit-specific information, that will be pertinent to subsequent processes in the design flow (e.g., during design layout generation). That is, such "imaginary" devices are superfluous to IC functionality, but are included in the schematic diagram to ensure that certain properties of the actual components of the IC, which are not otherwise noted by the schematic diagram, will be known and can be acted upon during subsequent processes in the design flow (e.g., according to specific design rules). Thus, such "imaginary devices" could also be referred to as reporting devices, notification devices, parameter identification devices, etc. Those skilled in the art will recognize that a "single-pin" device is a device that has only a single point of connection to an IC and not multiple points of connection. A "single-pin imaginary device" is connected by that "single point of connection" to one specific component (e.g., one specific net, one specific device, etc.) within the circuit for providing information about that one specific component. Therefore, it should be understood that, when ICs are manufactured based on a schematic diagram that includes single-pin imaginary devices, the imaginary devices will not be manufactured and, thus, will not cause changes in any logical operation, will not draw any power, will not change any electrical characteristic, etc.

In an embodiment, a schematic diagram is generated and includes: nets and, connected to at least some of the nets, single-pin first and second imaginary devices. On any given net, the first imaginary device is associated with a tracking group property of that net (with all nets in the same tracking group being in-phase, also referred to as being "tracking nets") and the second imaginary device is associated with a voltage property of that net. A design layout is generated based on the schematic diagram and includes: net shapes representing the nets and, on the net shapes representing any tracking nets that are connected to first and second imaginary devices, tracking group and voltage labels corresponding to the tracking group and voltage properties of those tracking nets. Net shape placement within the design layout and subsequent design rule checking are performed according to tracking group and voltage-aware design rules for area-optimization and/or chip reliability. That is, the design rules dictate placing net shapes with the same tracking group label together and further dictate minimum allowable spacing requirements that are smallest for net shapes with the same tracking group and voltage labels, larger for net shapes with the same tracking group label but different voltage labels, and even larger for net shapes with different tracking group labels and/or no tracking group labels.

Referring to FIG. 1, disclosed herein are embodiments of a computer-aided design (CAD) system 100 for integrated circuits (ICs) and a corresponding IC design method that enable components with common features to be identified and considered during the design flow, particularly, during IC design layout generation (e.g., for area-optimization) and/or layout verification (e.g., for chip reliability).

One exemplary embodiment of the design system 100 can include one or more processors 120, one or more displays 130, and one or more memories 110 (i.e., one or more computer readable storage mediums or devices). The various components of the design system 100 including, but not limited to, the processor(s) 120, display(s) 130, and memories 110 can be interconnected over a system bus 101, as illustrated, and/or over a wired or wireless network (not shown).

The memory 110 can store one or more electronic design automation (EDA) tools 140 (e.g., specialized software program(s)) for performing one or more design processes, as discussed below. Exemplary EDA tools 140 can include, but are not limited to: a schematic generator/editor 141 for generating and/or editing a schematic diagram, a power planning tool 148, a timing analysis tool 149, a layout generator/editor 142 (e.g., a schematic-driven layout (SDL) tool) for generating and/or editing a design layout, a layout versus schematic (LVS) tool 143 (including sub-tools 144-146, discussed in greater detail below) for determining whether a design layout properly reflects the schematic diagram; and a design rules checker (DRC) tool 147 for determining whether or not any design rules have been violated during the various design processes. Those skilled in the art will recognize that other EDA tools 140 (not shown) can optionally be incorporated into the design system 100 and can include, for example, a simulator (e.g., a Simulation Program with Integrated Circuit Emphasis (SPICE) simulator) for simulating IC performance based on the design layout a voltage drop verification tool for detecting voltage drops across a network, etc.

The memory 110 can further store design information 150, which is accessible and usable by one or more of the EDA tools 140 during various IC design processes. The design information 150 can be in the form, for example, of a process design kit (PDK). The design information 150 can include, but is not limited to, technology files 155 for a specific technology node, rule decks 156, and various libraries (e.g., a library elements library 151, a labels library 153, etc.).

For purposes of this disclosure, technology files 155 refer to files that define the layers and devices that are available for a particular fabrication process as well as the generic physical and electrical rules for the specific technology node. Additionally, a library element library 151 is a database that defines multiple different library elements and the symbols thereof that can be incorporated into a schematic diagram of an IC under design in the specific technology node. Specifically, the library element library 151 can list library elements that can be incorporated into a schematic diagram for an IC design in the specific technology node. For each specific library element, the library element library 151 can provide a specific symbol for that library element and library files (.libs) that define various properties of that library element. The library elements listed in the library elements library 151 can include, for example, conventional library elements, such as discrete devices, standard cells, parameterized cells (Pcells), and/or circuit blocks (e.g., for memories and/or processors). Such conventional library elements are well known in the art and, thus, the details thereof have been omitted from this specification in order to allow the reader to focus on the salient aspects of the disclosed methods. The library elements listed in the library elements library 151 of the disclosed system 100 can also include non-conventional library elements and, specifically, imaginary devices along with symbols for those imaginary devices and user-selectable or programmable properties to be associated with those imaginary devices, as discussed in greater detail below. Finally, for purposes of this disclosure, rule decks 156 refer to discrete sets of design rules (also called run sets). Each rule deck includes design rules that are applicable to one or more of the particular processes in the design flow. Conventional rule decks include design rules that are applicable during floor planning, power planning, an input/output pin placement, library element placement, clock planning and wire routing. As discussed in greater detail below, the rule decks 156 of the disclosed system 100 can further include, for example, tracking group and voltage-aware design rules 157 for placement of circuit components (e.g., placement of library elements during library element placement and/or placement of nets during wire routing) during design layout generation and for layout verification and various other design rules 158.

Figure 2:
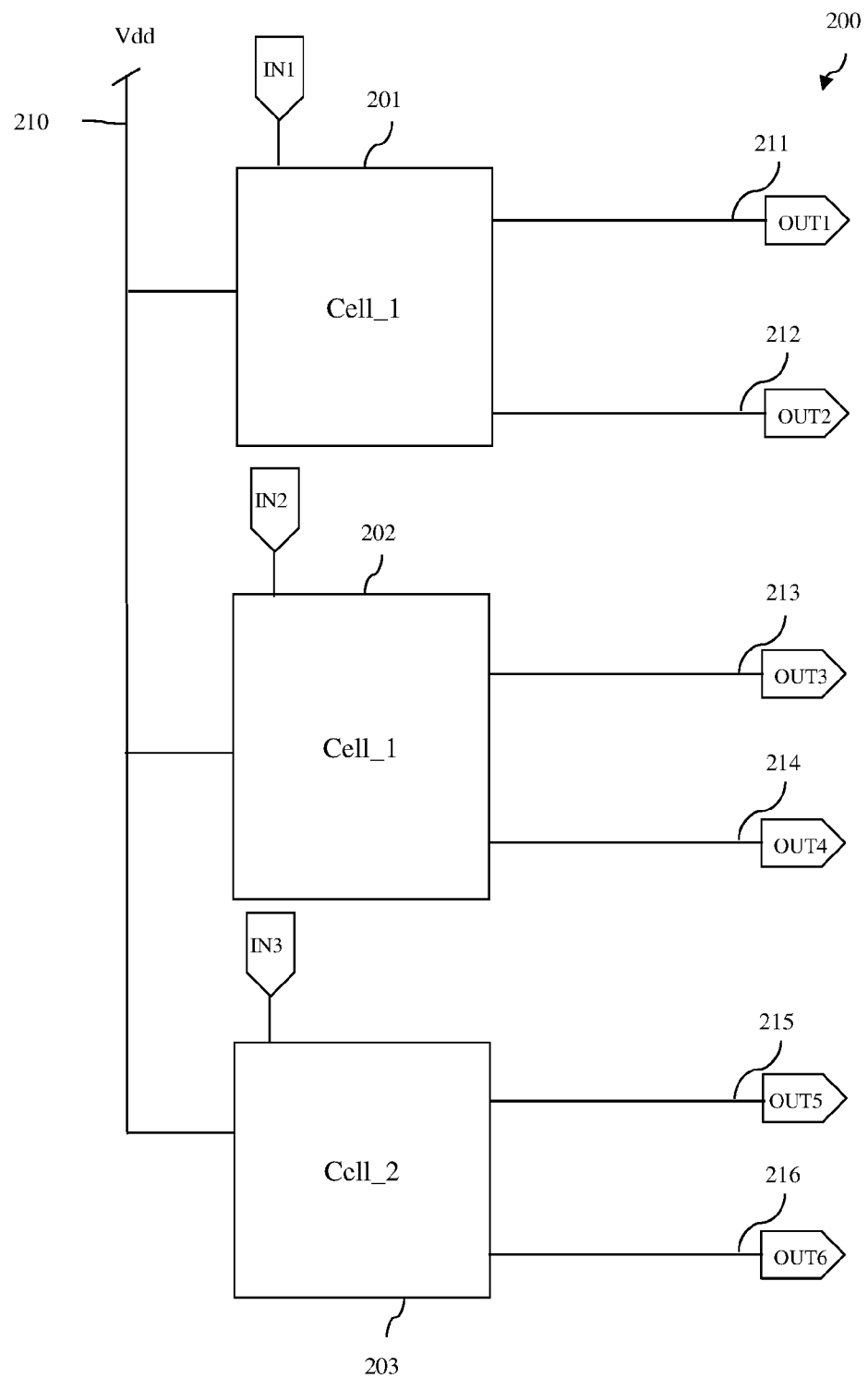
FIG. 2 is an exemplary preliminary schematic diagram that can be generated by the system of FIG. 1.

In operation, a designer (i.e., a user) can access the schematic generator/editor 141 and the library elements library 151 through a graphic user interface (GUI) on a display 130. Using the GUI, the user can select, from the library elements library 151, library elements corresponding to devices, cells, etc., and can add nets to interconnect those library elements as well as connect those library elements to input or output nodes, thereby creating a preliminary schematic diagram. For example, as illustrated in the exemplary preliminary schematic diagram 200 shown in FIG. 2, the selected library elements 201-203 includes multiple instances of a first cell (i.e., cell_1) and a single instance of a second cell (i.e., cell_2). The net 210 is added to indicate how the selected library elements 201-203 are wired together. The nets 211-212 are added to indicate the connections between the library element 201 and the output nodes OUT1-OUT2; the nets 213-214 are added to indicate the connections between the library element 202 and the output nodes OUT3-OUT4; and the nest 215-216 are added to indicate the connection between the library element 203 and the output nodes OUT5-OUT6.

The power planning tool 148 executed by the processor 120 can automatically plan power distribution for the IC including, but not limited to, determining the voltage properties (e.g., maximum high and low voltages) on the nets. Additionally, the timing analysis tool 149 executed by the process 120 can automatically compute the expected timing of the IC including, but not limited to, the phases of the signal being propagated on the nets. Based on the results of power planning and the timing analysis, the designer can group at least some of the nets based upon whether or not they are in-phase (i.e., whether or not signals propagated on those nets are in-phase). That is, the designer can determine which nets are in-phase (i.e., "tracking nets") and can assign those tracking nets to the same tracking group such that all nets in the same tracking group are in-phase and all nets in different tracking groups or not in the same tracking group are out-of-phase (i.e., propagate signals that are out-of-phase). The designer can further determine the voltage properties of those nets (e.g., during power-planning).

Once the tracking group and voltage properties of the nets are determined, the designer can edit the preliminary schematic diagram so that the tracking nets and voltage properties thereof can be identified during subsequent processes in the design flow. To accomplish this, the designer can select library elements corresponding to appropriate imaginary devices from the library elements library 151 and add those library elements to the preliminary schematic diagram to generate a completed schematic diagram (e.g., see the completed schematic diagram 300 shown in FIG. 3). Specifically, if the designer has determined that nets 211,213,215 and 216 will be in-phase and assigns them to tracking group A and also that nets 212 and 214 will be in-phase and assigns them to tracking group B, the designer can select single-pin first imaginary devices 221 to connect to each of these nets 211-216. Additionally, the designer can associate the appropriate tracking group properties (e.g., by user selection or programming) to each of these single-pin first imaginary devices. That is, the first imaginary devices 221 connected to the nets 211, 213, 215 and 216 will be associated with tracking group property A indicating that these nets are in-phase, whereas the first imaginary devices 221 connected to the nets 212 and 214 will be associated with tracking group property B indicating that these nets are in-phase with each other but out-of-phase with the nets 211,213,215 and 216 in tracking group A. The designer can select single-pin second imaginary devices 222 to connect to these nets 211-216 and can associate these second imaginary devices 222 with the appropriate voltage properties to each of these nets 211-215. For example, the second imaginary devices connected to nets 211 and 213 each have voltage properties including a maximum high voltage of 2.5 and maximum low voltage or 0.0; the second imaginary devices connected to nets 212, 214 and 215 each have voltage properties including a maximum high voltage of 1.2 and maximum low voltage of 0.0; and the second imaginary device connected to the net 216 has voltage properties including a maximum high voltage of 5.0 and maximum low voltage of 0.0. It should be noted that in the exemplary completed schematic diagram 300 shown in FIG. 3, although the nets 211, 213, 215 and 216 have the same tracking group properties (i.e., they belong to the same tracking group A), the nets 211 and 213 have different voltage properties as compared to the nets 215 and 216. Optionally, the designer can further select single-pin second imaginary device 222 to connect to nets not assigned to any tracking group (e.g., see the second imaginary device 222 connected to the net 210 and having a voltage property that is different from any of the other nets). Thus, as illustrated, the schematic diagram 300 depict nets (e.g., see nets 210-215) and, connected to at least two of the nets (e.g., see nets 211-215), single-pin first imaginary devices 221 associated with the tracking group properties of those nets (e.g., tracking group A or B) and single-pin second imaginary devices 222 associated with voltage properties of those nets (e.g., maximum high voltage of 2.5 and maximum low voltage or 0.0 or maximum high voltage of 1.2 and maximum low voltage of 0.0).

It should be understood that "single-pin" refers to the fact that these imaginary devices are connected to only one circuit component (e.g., a net in this exemplary embodiment). Additionally, for purposes of illustration, the first imaginary devices 221 are represented by a circle-T symbol and the second imaginary devices are represented by a circle-V symbol. However, it should be understood that, alternatively, these imaginary devices could be represented by any other suitable symbol. Furthermore, it should be understood that the completed schematic diagram 300 discussed above and illustrated in FIG. 3 is offered for illustration purposes and is provided to best describe operation of the exemplary design system 100 during subsequent design processes (e.g., design layout generation, physical verification, etc.). As illustrated, the schematic diagram 300 includes multiple nets in each of two different tracking groups (e.g., groups A and B). However, this schematic diagram 300 is not intended to be limiting. Alternatively, a schematic diagram could be generated that includes multiple nets, but only a single tracking group, or multiple nets in each of more than two different tracking groups.

In any case, the completed schematic diagram can be stored in a memory 110. Next, the layout generator/editor 142, executed by the processor 120, can automatically generate a design layout 112 based on the completed schematic diagram 300 and store that design layout 112 in memory 110. As mentioned above, the layout generator/editor 142 can be a schematic-driven layout (SDL) tool, which generates a design layout 112 that will contain geometric shapes (i.e., polygons) that correspond to mask patterns in the different levels of the IC (e.g., active device level, poly silicon level, metal levels, etc.) as required by the schematic diagram and placement of the shapes in the design layout during, for example, library element placement and wire routing processes, will be made with the goal of avoiding any design rule violations. Generally, layout generator/editor tools are well known in the art and, thus, the details of these tools have been omitted from the specification in order to allow the reader to focus on the salient aspects of the disclosed invention. However, in addition to the standard features of a layout generator/editor, the layout generator/editor 142 in the exemplary embodiment disclosed herein can be configured to, not only recognize the conventional library elements 201-203 (e.g., for devices, cells, etc.) and nets 210-215 within the schematic diagram 300, but also to recognize the first and second imaginary devices 221-222, discussed above, and to process these imaginary devices in a particular manner during layout generation.

Specifically, the layout generator/editor 142 uses the library elements library 151 during generation of the design layout 112 to identify the components of the IC under design based on the symbols in the schematic diagram and also based on the interconnections between those symbols. This includes identifying any first imaginary devices 221 and any second imaginary devices 222 connected to the nets 210-215 given symbols thereof (e.g., the circle-T and circle-V symbols). The layout generator/editor 142 further recognizes that certain symbols do not represent actual devices to be manufactured based on the design layout, but rather represent imaginary devices that are employed in order to provide additional, circuit-specific information, that will be pertinent during layout generation. In this exemplary embodiment, the layout generator/editor 142 recognizes that the circle-T and circle-V symbols represent first and second imaginary devices 221 and 222, respectively, and that these imaginary devices are employed in order to provide additional, circuit-specific information, that will be pertinent during wire routing of the nets.

Figure 3:
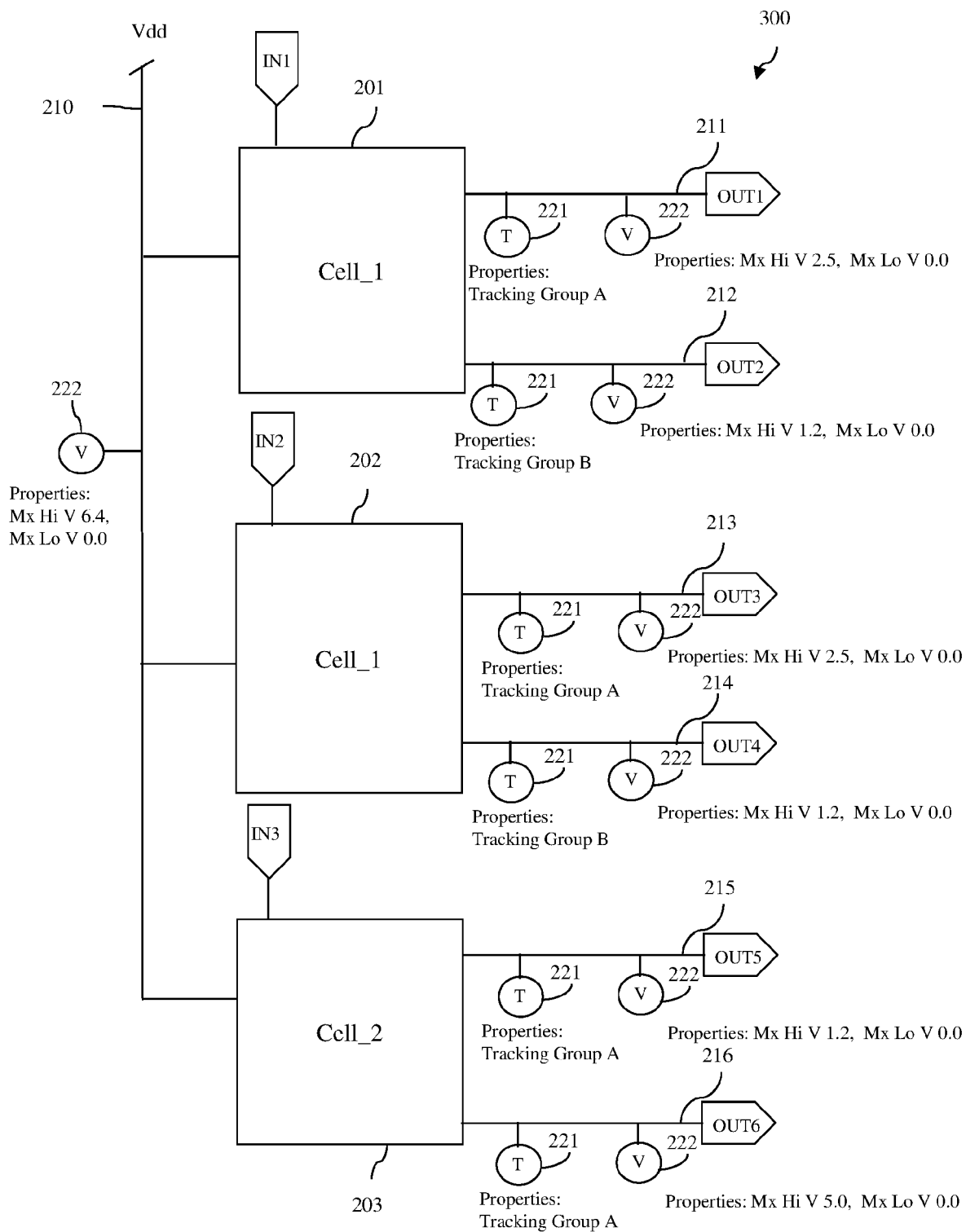
FIG. 3 is an exemplary completed schematic diagram edited by the system of FIG. 1 to include imaginary elements used to identify tracking nets and voltage properties thereof.
Figure 4:
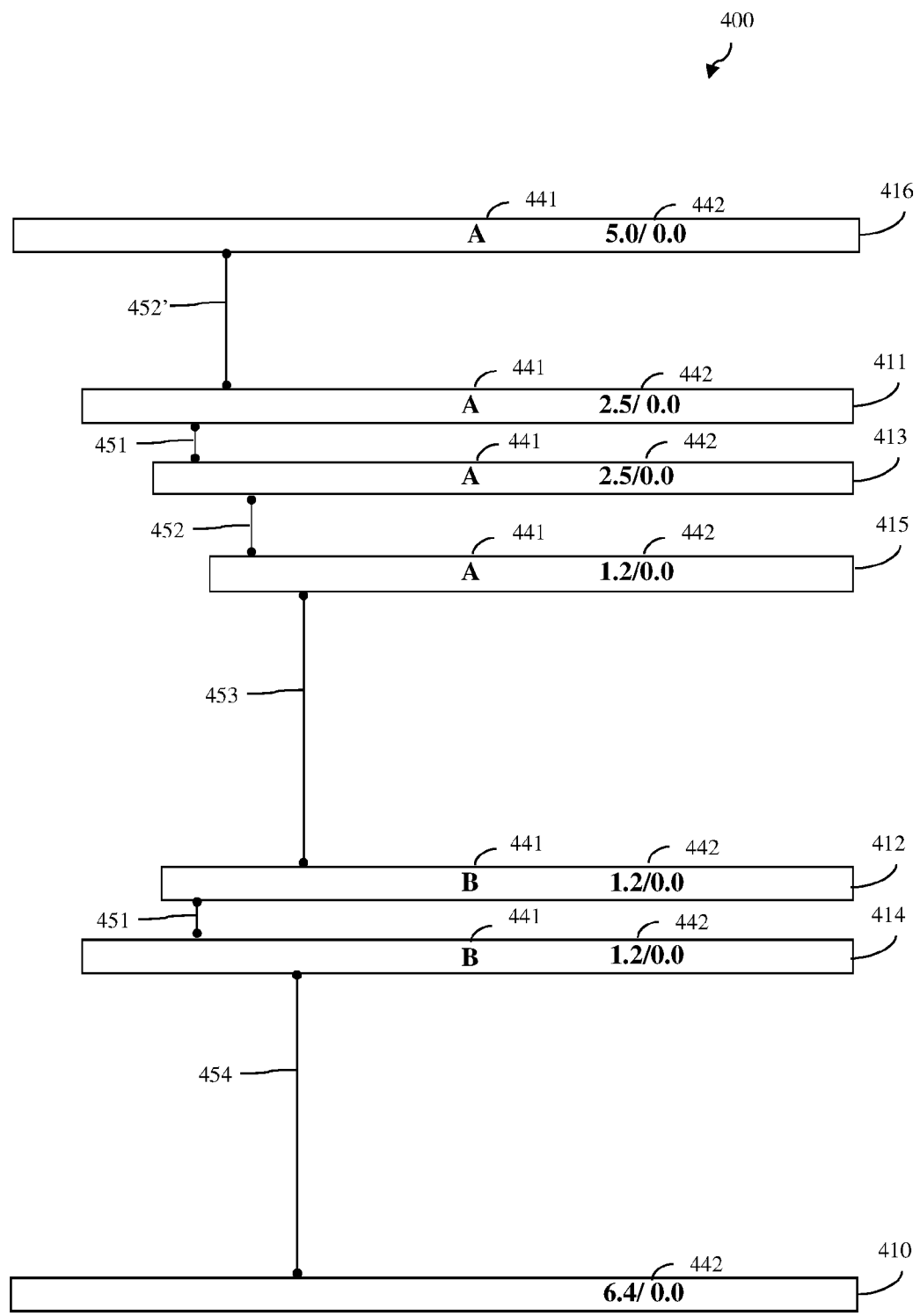
FIG. 4 is a drawing illustrating an exemplary portion of a design layout generated by the system of FIG. 1 based on the schematic diagram of FIG. 3 and according to tracking group and voltage-aware design rules.

For example, FIG. 4 illustrates an exemplary portion 400 of a design layout 112 generated based on the schematic diagram 300 of FIG. 3 and stored in memory 110. This portion 400 illustrates a metal level with net shapes 410-416 therein that represent the nets 210-216, respectively, from the schematic diagram 300. It should be understood that the exemplary portion 400 of the design layout shown in FIG. 4 is not complete. That is, other shapes that would be placed in the same metal level during routing as well as in levels above or below (e.g., underlying or overlaying the net shapes 410-416) have been omitted from the illustration in order avoid clutter and highlight the novel aspects of the disclosed embodiment.

In any case, the design layout 112 and, particularly, the portion 400 shown in FIG. 4 can further be generated so as to include specific tracking group and voltage labels 441-442 on each specific net shape 411-416 that represents a specific net 211-216 that has been previously identified as a tracking net and, thus, connected to a single-pin first imaginary device 221 and a single-pin second imaginary device 222 in the schematic diagram 300. The specific tracking group and voltage labels 441-442 can correspond to the specific tracking group and voltage properties of the respective nets. As illustrated, net shape 411 has tracking group and voltage labels A and 2.5/0.0; net shape 411 has tracking group and voltage labels B and 1.2/0.0, net shape 413 has tracking group and voltage labels A and 2.5/0.0; net shape 414 has tracking group and voltage labels B and 1.2/0.0; net shape 415 has tracking group and voltage labels A and 1.2/0.0 and net shape 416 has tracking group and voltage labels A and 5.0/0.0. It should be noted that net shape 410, which corresponds to a non-tracking net 210, has only a voltage label 6.4/0.0.

The layout generator/editor 142 can further establish placement of the net shapes 410-416 within the design layout during routing. This placement process can specifically be tracking group and voltage label dependent (i.e., according to tracking group and voltage-aware design rules 157 that provide for placement based upon the tracking group and voltage labels 441-442).

For example, the tracking group and voltage-aware design rules 157 can prioritize grouping together, within the design layout during routing, net shapes that have the same tracking group label. Thus, as illustrated in FIG. 4, net shapes 411, 413, 415, and 416 where the tracking group label 441 is an A can be grouped together in the same area of the design layout, if possible. Similarly, net shapes 412 and 414 where the tracking group label 441 is a B can further be grouped together, if possible.

Additionally, the tracking group and voltage-aware design rules 157 can further set forth tracking group and voltage label dependent minimum allowable space requirements between adjacent net shapes. For example, the design rules 157 can specify a first minimum allowable space 451 between adjacent net shapes with a same tracking group label and a same voltage label (e.g., see the space between adjacent net shapes 411 and 413, which have the same tracking group and voltage labels 441-442 (A and 2.5/0.0); see also the space between adjacent net shapes 412 and 414, which also have the same tracking group and voltage labels 441-442 (B and 1.2/0.0). The nets represented by these net shapes in the design layout will be in-phase and have no differential between the maximum voltages and, thus, these nets run the lowest risk of time dependent dielectric breakdown (TDDB) and require only a minimal amount of separation space.

The tracking group and voltage-aware design rules 157 can further specify a second minimum allowable space 452 between adjacent net shapes with a same tracking group label and different voltage labels (e.g., see the space between the net shapes 413 and 415, which have the same tracking group label (A) and different voltage labels 2.5/0.0 and 1.2/0.0, respectively). The nets represented by these net shapes in the design layout will run a higher risk of TDDB since the signals propagated on these nets are in-phase but the nets have different maximum voltage levels. Thus, this second minimum allowable space 452 will be greater than the first minimum allowable space 451. Optionally, for this set of net shapes (i.e., net shapes with a same tracking group label and different voltage labels), the design rules 157 can further specify multiple different second minimum allowable spaces 452 and 452' that are triggered at various voltage differential thresholds (i.e., depending upon the size of the voltage differences between the nets). For example, the design rules can specify that, when the tracking group label is the same, a voltage differential up to 2.0 (i.e., the different between the maximum voltages on the adjacent nets) can require the second minimum allowable space 452 (e.g., see the space between net shapes 413 and 415 where the voltage differential is 1.3); however, a voltage differential that is over 2.0 volts can require another second minimum allowable space 452' (e.g., see the space between net shapes 416 and 411 with the same tracking group label A and different voltage labels 5.0/0 and 2.5/00, respectively, where the voltage differential is 2.5) that is larger than the previously mentioned second minimum allowed space 452; and so on.

The tracking group and voltage-aware design rules 157 can further specify a third minimum allowable space 453 between any adjacent net shapes with different tracking group labels (e.g., see the space between adjacent net shapes 415 and 412) or between any adjacent net shapes not labeled with tracking group labels or between any adjacent nets shapes, wherein one of the net shapes is labeled with a tracking group label and the other is not. The nets represented by these net shapes in the design layout will generally run a higher risk of TDDB than nets that are in-phase and, thus, will require a larger separation space. It should be noted that in the example provided, the net shapes 415 and 412 have different tracking group labels (A and B, respectively), but the same voltage labels. Optionally, this third minimum allowable space can apply regardless of whether the voltage labels are the same or different. Alternatively, the third minimum allowable space can apply when both the tracking group labels and the voltage labels are the same and the design rules 157 can further specify a fourth minimum allowable space 454, which is greater than the third minimum allowable space 453 and which can be applied when the adjacent net shapes have different tracking group labels (or no tracking group labels) and different voltage labels (e.g., see the space between adjacent net shapes 414 and 410).

Optionally, the design rules 157 can further specify multiple fourth minimum allowable spaces (not shown) that are triggered at various voltage differential thresholds (i.e., depending upon the size of the voltage differences between the nets).

Due to the tracking group and voltage-aware design rules 157, the placement of the net shapes in the resulting design layout will be area-optimized to enable IC size scaling without negatively impacting performance. Those skilled in the art will recognize that IC design flows typically require the design layout to undergo physical verification before the final design layout proceeds to tape out. Physical verification of the design layout can include a layout-versus-schematic (LVS) process performed by an LVS tool 143 executed by the processor 120. Physical verification of the design layout can also include a design rules check (DRC). It should be noted that the DRC process can be completely independent of the LVS process and performed by a DRC tool 147 executed by the processor 120. Alternatively, the LVS tool 143 can be configured to perform a limited DRC and, particularly, a tracking group and voltage-aware DRC, as discussed in greater detail below.

Specifically, referring again to FIG. 1, the LVS tool 143 can include a layout-to-schematic converter 144, a schematic analyzer 145 and, optionally, a tracking group and voltage-aware design rules check (DRC) tool 146. The design system 100 can further include a memory 110 that stores the above-mentioned original schematic diagram 111, the design layout 112 and a labels library 153, which associates different labels with different imaginary devices.

Figure 5:
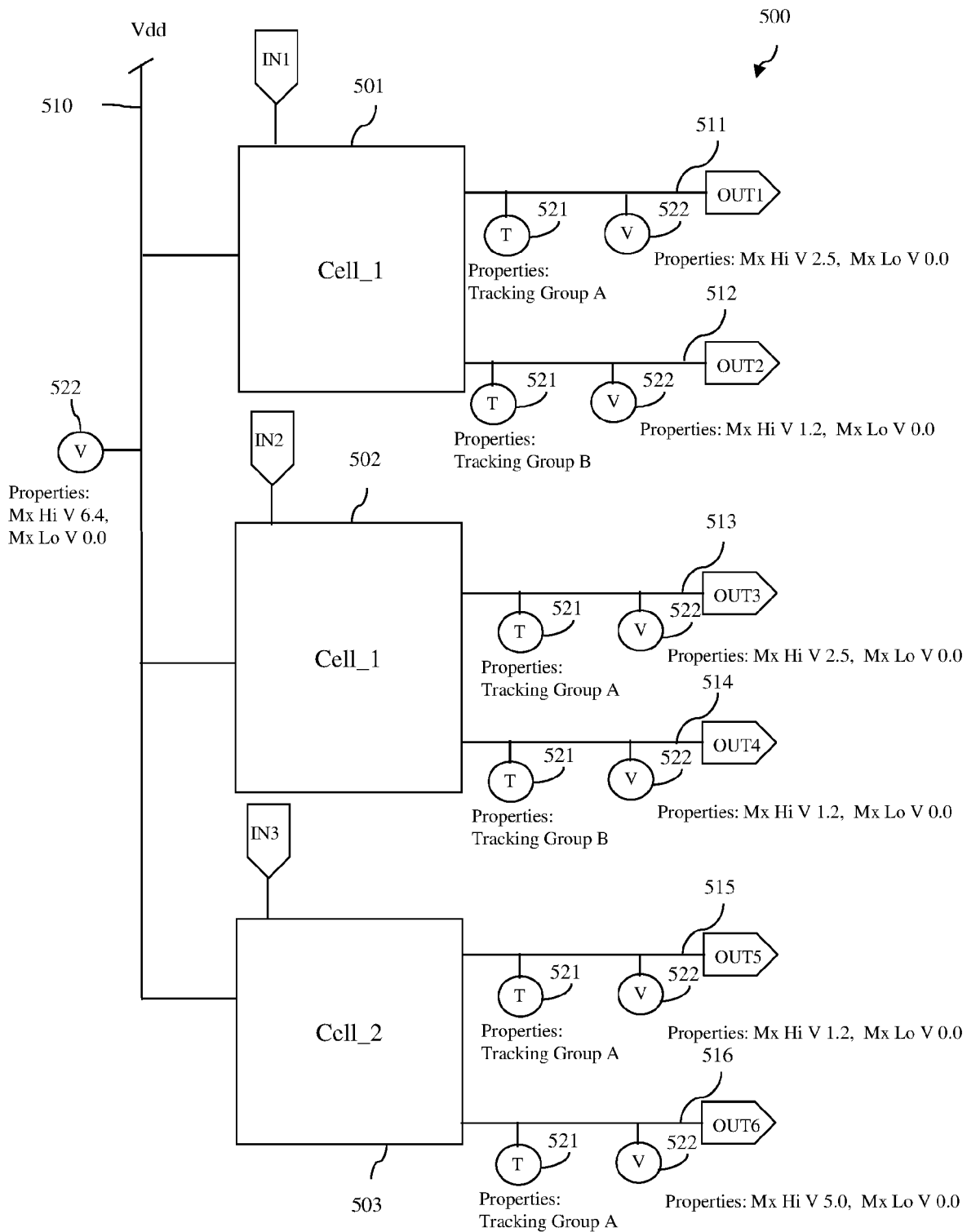
FIG. 5 is a new schematic diagram generated by the system of FIG. 1 based on a design layout.

During physical verification, the layout-to-schematic converter 144 can generate a new schematic diagram 500, as illustrated in FIG. 5, based on the design layout (i.e., can convert the design layout to a new schematic diagram). This conversion process can include: extracting the circuit components from the design layout (including the library elements 501-503 represented by various shapes in the design layout (not shown) and also including the nets 510-516 represented by the net shapes 410-416 in the portion 400 of design layout shown in FIG. 4); and reducing the design layout to a preliminary new schematic diagram that includes the extracted circuit components. Generally, layout-to-schematic converters capable of extracting circuit components from a design layout and reducing the design layout to a schematic diagram are well known in the art and, thus, the details of these tools have been omitted from the specification in order to allow the reader to focus on the salient aspects of the disclosed invention. However, in addition to the standard features of a layout-to-schematic converter, the layout-to-schematic converter 144 in the exemplary embodiment disclosed herein can further be configured to, not only extract the circuit components within the design layout, but also to recognize labels including the tracking group and voltage labels 441-442, discussed above, and to process those labels in a particular manner during new schematic generation. Specifically, the layout-to-schematic converter 144 can further recognize the tracking group and voltage labels 441-442 on the net shapes 411-416 in the design layout and then: access the labels library 153; look-up the tracking group and voltage labels 441-442 to acquire the first and second imaginary devices 521-522, respectively; connect first and second imaginary devices 521-522 to the nets 511-516 in the new schematic diagram 500; and associate those first and second imaginary devices 521-522 on each net with the appropriate tracking group and voltage properties specified by the labels.

The schematic analyzer 145 can further compare the new schematic diagram (e.g., the new schematic diagram 500 of FIG. 5) with the original schematic diagram (e.g., the completed schematic diagram 300 of FIG. 3) to determine whether the new schematic diagram and the original schematic diagram match. If design layout fails this comparison (i.e., if the new schematic diagram and the original schematic diagram do not match), the layout generator/editor 142 can make adjustments to the design layout and the physical verification process can be repeated.

As mentioned above, physical verification of the design layout can also include a design rules check (DRC). In the disclosed embodiment, the tracking group and voltage-aware DRC tool 146 of the LVS tool 143 can determine if any of the tracking group and voltage-aware design rules 157 have been violated. If design layout fails this limited DRC (i.e., if any of the tracking group and voltage-aware design rules 157 have been violated), the layout generator/ editor 142 can make adjustments to the design layout and the physical verification process can be repeated.

When the design layout passes the LVS process, including the comparison of the new schematic diagram to the original schematic diagram as well as the tracking group and voltage-aware DRC, the processor 120 can store a final design layout 113 in the memory 110 and also release that final design layout 113 to manufacturing. That is, IC chips can be manufactured according to this final design layout. Placement of the net shapes in this final design layout will be area-optimized (due to the tracking group and voltage-aware design rules), thereby enabling IC size scaling without negatively impacting performance.

The design system 100 described above and illustrated in FIG. 1 is just one exemplary embodiment offered for illustration purposes. Other embodiments of the design system could similarly use single-pin imaginary devices in a schematic diagram for the purpose of identifying one or more groups of components and also group-aware design rules during design layout generation and/or layout verification. Specifically, referring to FIG. 6, other embodiments of a design system 600 can include one or more processors 620, one or more displays 630, and one or more memories 610 (i.e., one or more computer readable storage mediums or devices). The various components of the design system 600 including, but not limited to, the processor(s) 620, display(s) 630, and memories 610 can be interconnected over a system bus 601, as illustrated, and/or over a wired or wireless network (not shown). The memory 610 can store one or more electronic design automation (EDA) tools 640. Exemplary EDA tools 640 can include, but are not limited to, essentially the same tools referenced above with regard to the design system 100: a schematic generator/editor 641, a power planning tool 648, a timing analysis tool 649, a layout generator/editor 642, a layout versus schematic (LVS) tool 643 (including sub-tools 644-646, discussed in greater detail below); a design rules check (DRC) tool 647, etc. The memory 610 can further store design information 650, which is accessible and usable by one or more of the EDA tools 640 during various IC design processes. The design information 650 can be in the form, for example, of a process design kit (PDK). The design information 650 can include, but is not limited to, technology files 655 for a specific technology node, rule decks 656 (including group-aware design rules 657 and other design rules 658), and various libraries (e.g., a library elements library 651, a labels library 653, etc.).

In operation, a designer (i.e., a user) can access the schematic generator/editor 641 and the library elements library 651 through a graphic user interface (GUI) on a display 630. Using the GUI, the user can select, from the library elements library 651, library elements corresponding to devices, cells, etc. and can add nets to interconnect those library elements as well as connect those library elements to input or output nodes, thereby creating a preliminary schematic diagram. The designer can subsequently assign any of the circuit components to a particular group, wherein all components within that particular group have some common feature (e.g., based on information acquired during a timing analysis, power planning, etc.). For example, in another exemplary embodiment (not shown), clock nets (i.e., nets carrying clock signals) could be grouped based on clock signal speeds (e.g., with group A being the group with the fastest clock signal speeds, group B being the next fastest, and so on). Once the group properties of the components are determined, the designer can edit the preliminary schematic diagram so that the group properties of the components can be identified during subsequent processes in the design flow. To accomplish this, the designer can select, from the library elements library 651, group-type specific single-pin imaginary devices and can add those imaginary devices to the preliminary schematic diagram such that that they are connected to the components that have been assigned to groups and such that they are associated with the group properties of the components. For example, when clock signal nets are grouped according to clock signal speeds, single-pin imaginary devices can be connected to the clock signal nets in the schematic diagram and associated with the appropriate clock signal speed group properties. It should be understood that "single-pin" refers to the fact that these imaginary devices are connected to only one circuit component.

The completed schematic diagram 611 can be stored in a memory 610. Next, the layout generator/editor 642, executed by the processor 620, can automatically generate a design layout 612 based on the completed schematic diagram 611 and can store that design layout 612 in memory 610. However, in addition to the standard features of a layout generator/editor, the layout generator/editor 642 can be configured to, not only recognize the conventional features within the schematic diagram, but also to recognize the imaginary devices, discussed above, and to process these imaginary devices in a particular manner during layout generation. Specifically, the layout generator/editor 642 uses the library elements library 651 during generation of the design layout 612 to identify the components of the IC under design based on the symbols in the schematic diagram and also based on the interconnections between those symbols. The layout generator/editor 642 further recognizes that certain symbols do not represent actual devices to be manufactured based on the design layout 612, but rather represent imaginary devices that are employed in order to provide additional, circuit-specific information, that will be pertinent during layout generation and/or layout verification. In this case, the layout generator/editor 642 generates a design layout 612 that includes shapes representing components at different levels of the IC design and also group labels on any of those shapes that were connected to imaginary devices. The group labels will correspond to the group properties of the components. Specific placement of the shapes within the design layout (e.g., during library element placement and/or routing) can be group label dependent (i.e., can be performed according to group-aware design rules 657).

For example, the group-aware design rules 657 can include a rule that prioritizes grouping together, within the design layout, any shapes that have the same group label. Other group-label dependent design rules could prohibit grouping together, within the design layout, of any of the shapes having a same group label or prohibit grouping together, within the design layout of any of the shapes having different group labels. In this case such rules would apply where interaction between the shapes within the group or within the different groups would be detrimental to the function of the design or detrimental to manufacturability. Additionally or alternatively, the group-aware design rules 657 could include any other rule that can be applied generally to all the components in a given group in order to optimize placement. Additionally or alternatively group-label dependent design rules can be applied to exert a higher or lower level of verification on a group without affecting others. For example, when clock signal nets are grouped according to clock signal speeds, design rules could be established to isolate some clock nets (e.g., high speed clock nets in group A) from power and/or ground nets (e.g., to prevent interference). Additionally or alternatively, design rules could be established to isolate some clock nets (e.g., high speed clock nets in Group A) from other clock nets (e.g., slower speed clock nets in other groups) to provide shielding.

Those skilled in the art will recognize that IC design flows typically require the design layout to undergo physical verification before the final design layout proceeds to tape out. Physical verification of the design layout can include a layout-versus-schematic (LVS) process performed by an LVS tool 643, executed by the processor 620. Physical verification of the design layout can also include a design rules check (DRC). It should be noted that the DRC process can be completely independent of the LVS process and performed a DRC tool 647 executed by the processor 620. Alternatively, the LVS tool 643 can be configured to perform a limited DRC and, particularly, a group-aware DRC, as discussed in greater detail below.

Specifically, referring again to FIG. 6, the LVS tool 643 can include a layout-to-schematic converter 644, a schematic analyzer 645 and, optionally, a group-aware design rules check (DRC) tool 646. The design system 600 can further include a memory 610 that stores the above-mentioned original schematic diagram 611, the design layout 612 and a labels library 653, which associates different labels with different imaginary devices. During physical verification, the layout-to-schematic converter 644 can automatically generate a new schematic diagram based on the design layout 612 (i.e., can convert the design layout to a new schematic diagram). This conversion process can include: extracting the circuit components from the design layout; and reducing the design layout to a preliminary new schematic diagram that includes the extracted circuit components. Additionally, this conversion process can include: recognizing group labels; using the labels library 653 to identify imaginary devices to be included in the new schematic diagram; connecting the imaginary devices to the appropriate components in the new schematic diagram; and associating those imaginary devices with the appropriate group properties based on the group labels. The schematic analyzer 645 can further compare the new schematic diagram with the original schematic diagram to determine whether the new schematic diagram and the original schematic diagram match. If design layout fails this comparison (i.e., if the new schematic diagram and the original schematic diagram do not match), the layout generator/editor 642 can make adjustments to the design layout and the physical verification process can be repeated. As mentioned above, physical verification of the design layout can also include a DRC process. In the disclosed embodiment, the group-aware DRC tool 646 of the LVS tool 643 can determine if any of the group-aware design rules 657 have been violated. If design layout fails this limited DRC (i.e., if any of the group-aware design rules 657 have been violated), the layout generator/editor 642 can make adjustments to the design layout and the physical verification process can be repeated. When the design layout passes the LVS process, including the comparison of the new schematic diagram to the original schematic diagram as well as the group-aware DRC, the processor 620 can store the final design layout 613 in the memory 610 and can also release that final design layout 613 to manufacturing (i.e., so that IC chips can be manufactured according to the final design layout 613).

Figure 6:
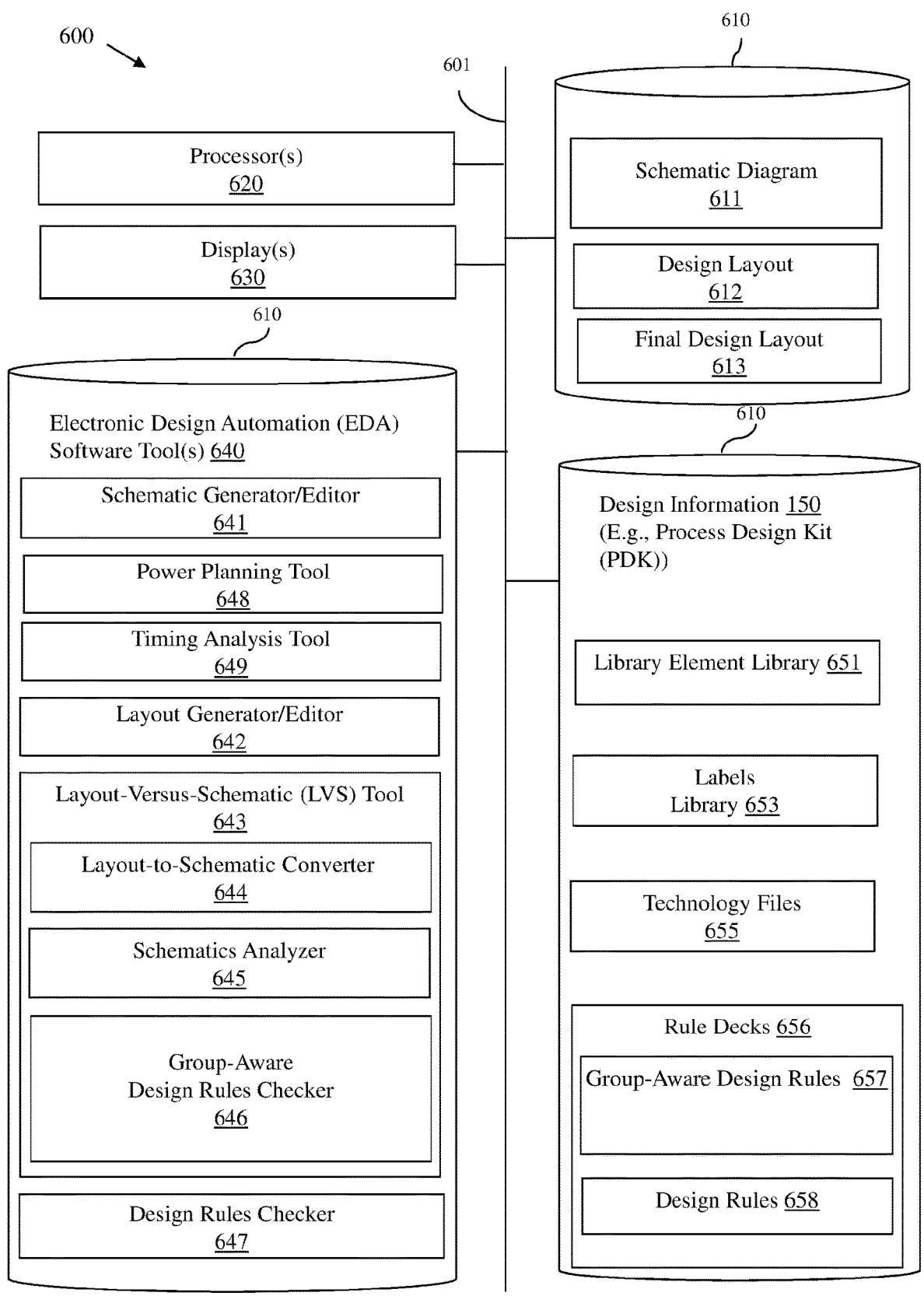
FIG. 6 is a schematic diagram illustrating another embodiment of a CAD system for integrated circuits.

FIGS. 1 and 6 illustrated the design systems 100 and 600, respectively, as consolidated systems configured to perform all of the various processes within the design flow. It should, however, be understood that these figures are not intended to be limiting and that, alternatively, the design systems 100, 600 could be distributed design systems that include multiple sub-systems with each sub-system configured with the required EDA tools (i.e., specialized software programs) to perform one or more of the various processes within the design flow. For example, a distributed design system could include: one sub-system with the components required to generate a schematic diagram; another sub-system that receives the schematic diagram as an input and that includes the components required to generate a design layout based on the schematic diagram; and yet another sub-system that receives the schematic diagram and the design layout as inputs and that is configured to perform physical verification.

Figure 7:
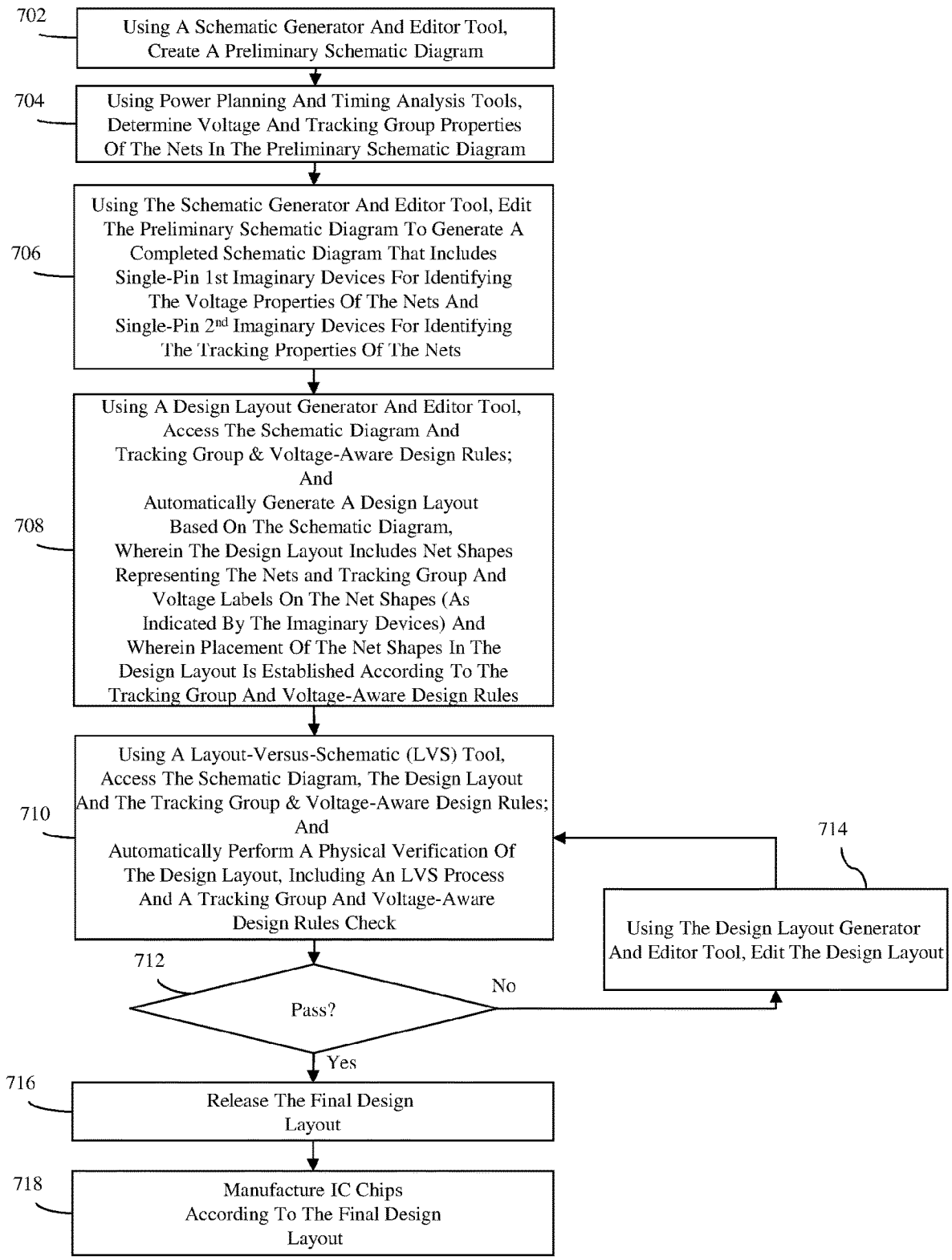
FIG. 7 is a flow diagram illustrating an embodiment of a design method.

Also disclosed herein are design method embodiments implemented using the above-described design system embodiments. For example, referring to the flow diagram of FIG. 7 in combination with the design system 100 of FIG. 1, an exemplary design method embodiment can include creating a preliminary schematic diagram for an integrated circuit (IC) (see process 702 and the discussion of the preliminary schematic diagram 200 of FIG. 2). This process 702 can be performed by a schematic generator/editor 141 executed, for example, by a processor 120 of a CAD system 100 based on designer inputs through a graphic user interface. Voltage and tracking group properties of the nets in the preliminary schematic diagram can be determined (see process 704). This process 704 can be performed by power planning and timing analysis tools 148-149 executed, for example, by the processor 120 of the CAD system 100. The preliminary schematic diagram can then be edited to include single-pin first imaginary devices connected to the nets for identifying the voltage properties of the nets and single-pin second imaginary devices connected to the nets for identifying the tracking group properties of the nets (see process 706 and the discussion of the completed schematic diagram 300 of FIG. 3 above). This process 706 can be performed by the schematic generator/editor 141 executed, for example, by the processor 120 of the CAD system 100.

A design layout for the IC can subsequently be automatically generated based on the completed schematic diagram (see process 708 and the discussion of the exemplary portion 400 of the design layout shown in FIG. 4). The design layout can be generated by a design layout generator 142 executed, for example, by the processor 120 of the CAD system 100. The design layout will contain geometric shapes (i.e., polygons) that correspond to mask patterns in the different levels of the IC (e.g., active device level, polysilicon level, metal levels, etc.) as required by the schematic diagram. The geometric shapes can include, for example, net shapes corresponding to the different nets in the schematic diagram.

The process 708 of generating the design layout can further include recognizing first and second imaginary devices connected to the nets in the schematic diagram and, given the properties associated with those first and second imaginary devices, adding appropriate tracking group and voltage labels to the net shapes in the design layout. The specific tracking group and voltage labels on each net shape will correspond to the specific tracking group and voltage properties of the respective nets (as indicated by the imaginary devices). For example, as illustrated in FIG. 4, net shape 411 has tracking group and voltage labels A and 2.5/0.0; net shape 411 has tracking group and voltage labels B and 1.2/0.0, net shape 413 has tracking group and voltage labels A and 2.5/0.0; net shape 414 has tracking group and voltage labels B and 1.2/0.0; net shape 415 has tracking group and voltage labels A and 1.2/0.0 and net shape 416 has tracking group and voltage labels A and 5.0/0.0. It should be noted that net shape 410, which corresponds to a non-tracking net 210, has only a voltage label 6.4/0.0.

The process 708 of generating the design layout can further include placing the net shapes within the design layout according to tracking group and voltage-aware design rules 157 that provide for placement based upon the tracking group and voltage labels. For example, the tracking group and voltage-aware design rules 157 can prioritize grouping together, within the design layout during routing, net shapes that have the same tracking group label. The tracking group and voltage-aware design rules 157 can further set forth tracking group and voltage label dependent minimum allowable space requirements between adjacent net shapes.

After the design layout is generated, physical verification of the design layout can be performed and can include a layout-versus-schematic (LVS) process and a design rules check (DRC) (see process 710). The LVS process can be performed by an LVS tool 143 executed, for example, by a processor 120 of the CAD system 100. It should be noted that the DRC can be completely independent of the LVS process (e.g., performed by a DRC tool 147 executed, for example, by the processor 120 of the CAD system 100). Alternatively, the LVS process performed by the LVS tool 143 can include a limited DRC and, particularly, a tracking group and voltage-aware DRC, as discussed in greater detail below.

Specifically, during physical verification at process 710, a new schematic diagram can be generated (e.g., by a layout-to-schematic converter tool 144 of an LVS tool 143) based on the design layout (see the new schematic diagram 500 of FIG. 5 and the detailed discussion above). That is, the design layout can be converted into a new schematic diagram. This conversion process can include: extracting the circuit components, including nets, from the design layout and reducing the design layout to a preliminary new schematic diagram that includes the extracted circuit components. The conversion process can also include recognizing the tracking group and voltage labels on the net shapes in the design layout and, based on those labels, connecting first and second imaginary devices with the appropriate voltage and track group properties to the nets in the new schematic diagram.

During the physical verification at process 710, the new schematic diagram (e.g., the new schematic diagram 500 of FIG. 5) can be compared to the original schematic diagram (e.g., the completed schematic diagram 300 of FIG. 3) to determine whether the new schematic diagram and the original schematic diagram match. If design layout fails this comparison (i.e., if the new schematic diagram and the original schematic diagram do not match) (see process 712) adjustments can be made (e.g., by a layout generator/editor 142 executed, for example, by the processor 120 of the CAD system 100) to the design layout (see process 714) and then the physical verification process 710 can be repeated.

As mentioned above, the physical verification process 710 can also include a DRC process. That is, the design layout can be checked (e.g., by a tracking group and voltage-aware DRC tool 146 of the LVS tool 143 or by a discrete DRC tool 147) to determine if any of the tracking group and voltage-aware design rules 157 have been violated. If design layout fails this limited DRC (i.e., if any of the tracking group and voltage-aware design rules 157 have been violated) (see process 712), adjustments can be made (e.g., by the layout generator/editor 142) to the design layout (see process 714) and then the physical verification process 710 can be repeated.

When the design layout passes the physical verification process 710, including the LVS and DRC processes, a final design layout can be stored and also released to manufacturing (see process 716). Subsequently, IC chips can be manufactured according to this final design layout (see process 718). Placement of the net shapes in this final design layout will be area-optimized (due to the tracking group and voltage-aware design rules), thereby enabling IC size scaling without negatively impacting performance.

It should be noted that other design method embodiments could similarly use single-pin imaginary devices in a schematic diagram for the purpose of identifying one or more groups of components and also group-aware design rules during design layout generation. Also disclosed herein are design method embodiments implemented using the above-described design system embodiments. For example, referring to the flow diagram of FIG. 8 in combination with the design system 600 of FIG. 6, an exemplary design method embodiment can include creating a preliminary schematic diagram for an integrated circuit (IC) (see process 802). This process 802 can be performed by a schematic generator/editor 641 executed, for example, by a processor 620 of a CAD system 600 based on designer inputs through a graphic user interface. Group properties of components in the preliminary schematic diagram can be determined (i.e., at least some of the components can be assigned to group(s) based on some common feature) (see process 804). This process 804 can be performed, for example, by power planning, timing analysis tools and/or any other suitable EDA tool executed, for example, by the processor 620 of the CAD system 600. The preliminary schematic diagram can then be edited to include single-pin imaginary devices connected to components to identify the previously determined group properties (see process 806). This process 806 can be performed by the schematic generator/editor 641 executed, for example, by the processor 620 of the CAD system 600.

A design layout for the IC can subsequently be automatically generated based on the completed schematic diagram (see process 808). The design layout can be generated by a design layout generator 642 executed, for example, by the processor 620 of the CAD system 600. The design layout will contain geometric shapes (i.e., polygons) that correspond to mask patterns in the different levels of the IC (e.g., active device level, polysilicon level, metal levels, etc.) as required by the schematic diagram.

The process 808 of generating the design layout can further include recognizing imaginary devices connected to some of the components in the schematic diagram and, given the group properties associated with those imaginary devices, adding appropriate group labels to the shapes in the design layout. The specific group labels on the shapes will correspond to the group properties of the components (as indicated by the imaginary devices). The process 808 of generating the design layout can further include placing the shapes within the design layout according to group-aware design rules 657 that provide for placement based upon the group labels.

After the design layout is generated, physical verification of the design layout can be performed and can include a layout-versus-schematic (LVS) process and a design rules check (DRC) (see process 810). The LVS process can be performed by an LVS tool 643 executed, for example, by a processor 620 of the CAD system 600. It should be noted that the DRC can be completely independent of the LVS process (e.g., performed by a DRC tool 647 executed, for example, by the processor 620 of the CAD system 600). Alternatively, the LVS process performed by the LVS tool 643 can include a limited DRC and, particularly, a group-aware DRC.

Specifically, during physical verification at process 810, a new schematic diagram can be generated (e.g., by a layout-to-schematic converter tool 644 of an LVS tool 643) based on the design layout. That is, the design layout can be converted into a new schematic diagram. This conversion process can include: extracting the circuit components from the design layout and reducing the design layout to a preliminary new schematic diagram that includes the extracted circuit components. The conversion process can also include recognizing the group labels on any of the shapes in the design layout and, based on those labels, connecting imaginary devices with the appropriate group properties to specific components in the new schematic diagram.

During the physical verification at process 810, the new schematic diagram can be compared to the original schematic diagram to determine whether the new schematic diagram and the original schematic diagram match. If design layout fails this comparison (i.e., if the new schematic diagram and the original schematic diagram do not match) (see process 812) adjustments can be made (e.g., by a layout generator/editor 642 executed, for example, by the processor 620 of the CAD system 600) to the design layout (see process 814) and then the physical verification process 810 can be repeated.

As mentioned above, the physical verification process 810 can also include a DRC process. That is, the design layout can be checked (e.g., by a tracking group and voltage-aware DRC tool 646 of the LVS tool 643 or by a discrete DRC tool 647) to determine if any of the group-aware design rules 657 have been violated. If design layout fails this limited DRC (i.e., if any of the tracking group and voltage-aware design rules 657 have been violated) (see process 812), adjustments can be made (e.g., by the layout generator/editor 642) to the design layout (see process 814) and then the physical verification process 810 can be repeated.

When the design layout passes the physical verification process 810, including the LVS and DRC processes, a final design layout can be stored and also released to manufacturing (see process 816). Subsequently, IC chips can be manufactured according to this final design layout (see process 818). Placement of shapes in this final design layout will be area-optimized (due to the group-aware design rules), thereby enabling IC size scaling without negatively impacting performance.

Also disclosed herein is a computer program product for IC design, as described above. The computer program product can comprise a computer readable storage medium having program instructions embodied therewith (e.g., stored thereon). These program instructions can be executable by the computer to cause the computer to perform the above-described method. More particularly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
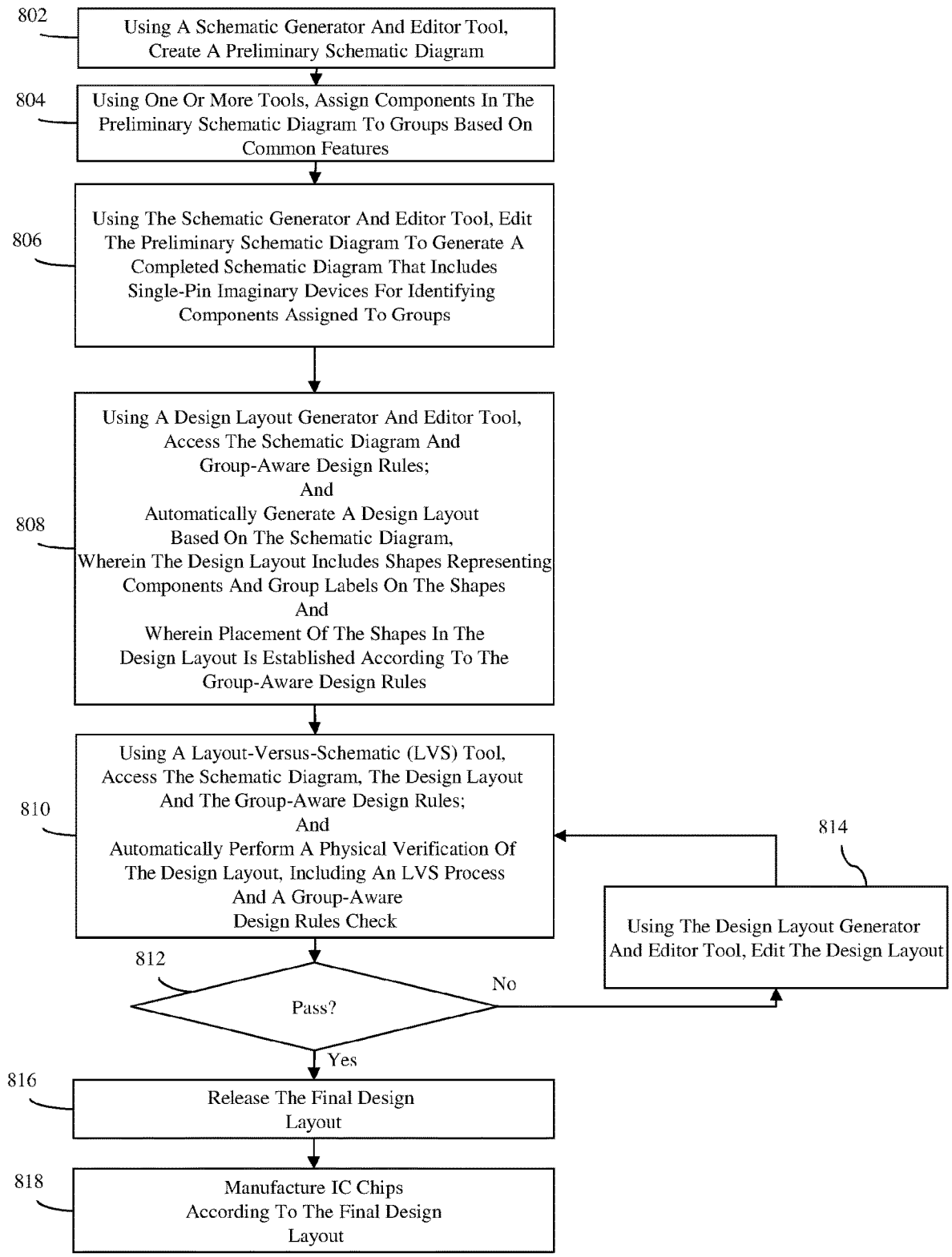
FIG. 8 is a flow diagram illustrating another embodiment of a design method.
Figure 9:
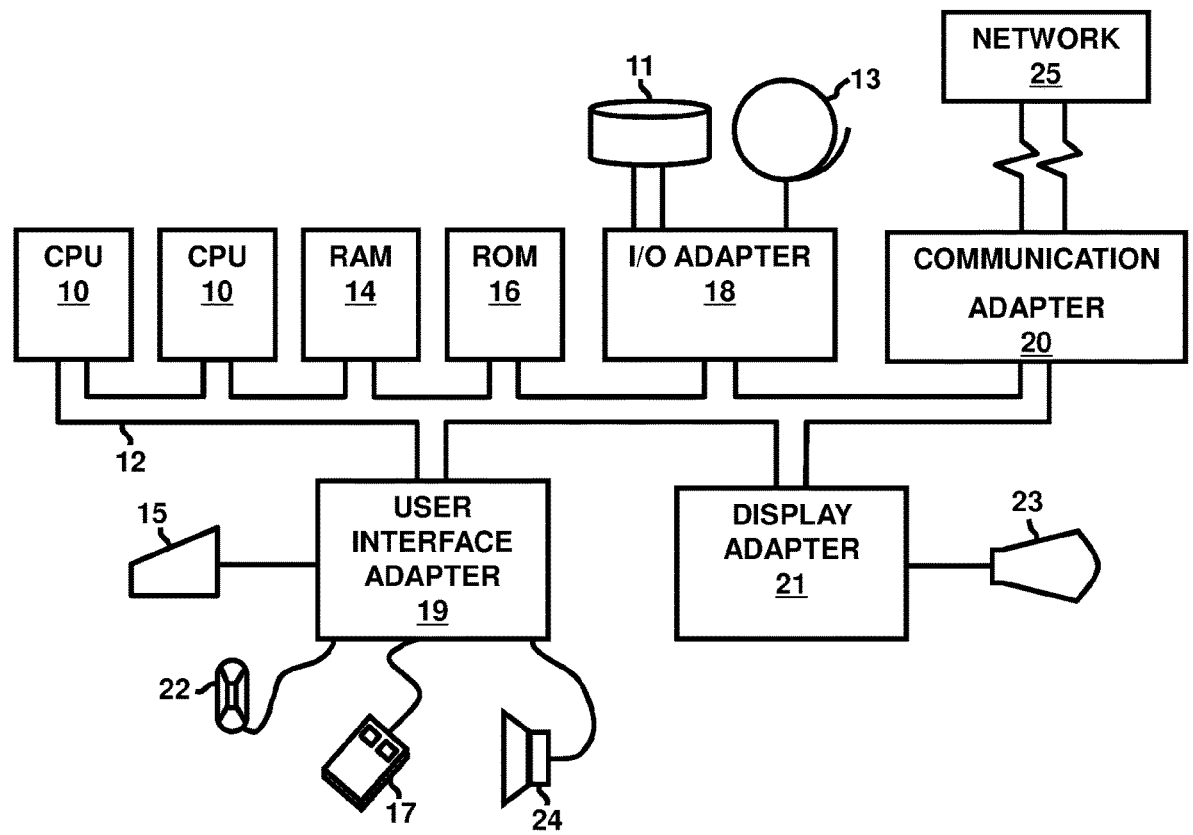
FIG. 9 depicts a representative hardware environment (i.e., a computer system) that can be employed to implement features of the disclosed IC design systems, methods and computer program products.

FIG. 8 depicts a representative hardware environment (i.e., a computer system) that can be employed to implement features of the disclosed IC design systems, methods and computer program products. Specifically, this schematic drawing illustrates a hardware configuration of an information handling/computer system, which can be programmed with the various software programs described in detail above so as to become a special purpose computer for integrated circuit performance modeling. This computer system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The disclosed design system and method embodiments address a technology-specific problem and, particularly, a problem with designing and manufacturing integrated circuits that can be scaled in size without suffering reliability issues. Specifically, in conventional integrated circuit design, a design layout is automatically generated by a schematic-driven layout generator based on a schematic diagram and, particularly, based on the symbols and the connections between the symbols in the schematic diagram. Information regarding the circuit-specific operational properties (e.g., minimum and maximum operational voltages on nets, in-phase and out-of-phase status of signals on nets, clock signal speeds, etc.) associated with components (e.g., devices, power nets, signal nets, etc.) of the circuit is generally not included in the schematic diagram. Instead this information is either not considered during layout generation or considered during post-layout generation processing (e.g., when making manual adjustments to the design layout). Although such information could be helpful during initial design layout generation by a schematic-driven layout generator in order to minimize area consumption and/or ensure IC reliability from the start, there are problems associated with adding information to a schematic diagram. For example, configuring a schematic-driven layout generator to decipher text blocks, which are found on a schematic diagram and include operational information, and to further act on that information is a very complex, cost-prohibitive, and time-consuming task.

The disclosed design system and method embodiments provide a technical solution to this problem. Instead of simply adding text blocks to components in a schematic diagram, single-pin imaginary devices are connected to components in the schematic diagram. These imaginary devices, which are superfluous to IC functionality, are associated with circuit-specific operational information that will be pertinent during design layout generation. In this case, a schematic-driven layout generator is configured to automatically generate a design layout based on the schematic diagram and this process of generating the design layout includes recognizing the imaginary devices (e.g., using a library) and processing them in a particular manner (e.g., to add appropriate labels to shapes within the design layout) so that the operational properties of actual components of the IC, which are not otherwise noted by the schematic diagram, will be known and automatically acted upon during design layout generation (e.g., during placement according to label-dependent design rules). Additionally, a layout-versus-schematic tool is configured to generate a new schematic diagram based on the design layout during a physical verification process and this process of generating the new schematic diagram includes recognizing labels on shapes within the design layout and to process those labels in a particular manner (e.g., to automatically add appropriate single-pin imaginary devices to the new schematic diagram).

In other words, the disclosed design system and method embodiments improve the way information is stored. For example, information is represented by single-pin imaginary devices directly in a schematic diagram as opposed to being stored in a separate file. They also improve the way information is processed. For example, single-pin imaginary devices in a schematic diagram are recognized and, based on properties associated with the single-pin imaginary devices, labels are automatically placed on shapes and placement of the shapes in the design layout is established based on label-dependent design rules. Thus, the disclosed design system and method embodiments provide a simple means for circuit-specific operational information (e.g., minimum and maximum operational voltages on nets, in-phase and out-of-phase status of signals on nets, clock signal speeds, etc.) to be considered from the start without requiring manual intervention or complex text analyses, effectively reducing the turnaround time (TAT) for generation of a final design layout for an IC. Furthermore, as a result, IC chips manufactured according to the final design layout out are both area-optimized (i.e., with maximized device density given the known operational conditions) and reliable.

What is claimed is:

1. A method comprising:
   accessing, from a memory, a schematic diagram of a circuit,
   wherein the schematic diagram depicts components of the circuit and, connected to one or more of the components, single-pin imaginary devices associated with group properties of the components; and
   automatically generating a design layout for the circuit based on the schematic diagram, wherein the design layout comprises shapes representing the components and, on each shape representing a specific component that is connected to a single-pin imaginary device, a specific group label corresponding to a specific group property of the specific component, wherein placement of the shapes within the design layout is group label dependent, and
   wherein the accessing of the schematic diagram and the automatically generating of the design layout are performed by a layout generator tool executed by a processor of a computer-aided design system.

2. The method of claim 1, wherein the design layout comprises multiple different group labels for multiple different groups of components, respectively, from the schematic diagram.

3. The method of claim 1, wherein the automatically generating of the design layout further comprises accessing design rules stored in memory and using the design rules to establish the placement of the shapes within the design layout, wherein the design rules provide for any one of the following:
   prioritizing grouping together, within the design layout, of any of the shapes having a same group label;
   prohibiting grouping together, within the design layout, of any of the shapes having a same group label; and
   prohibiting grouping together, within the design layout, of any of the shapes having different group labels.

4. The method of claim 3, wherein the design layout is used to manufacture integrated circuit chips that are area-optimized and reliable due to the design rules.

* * * * *